Figure 3:
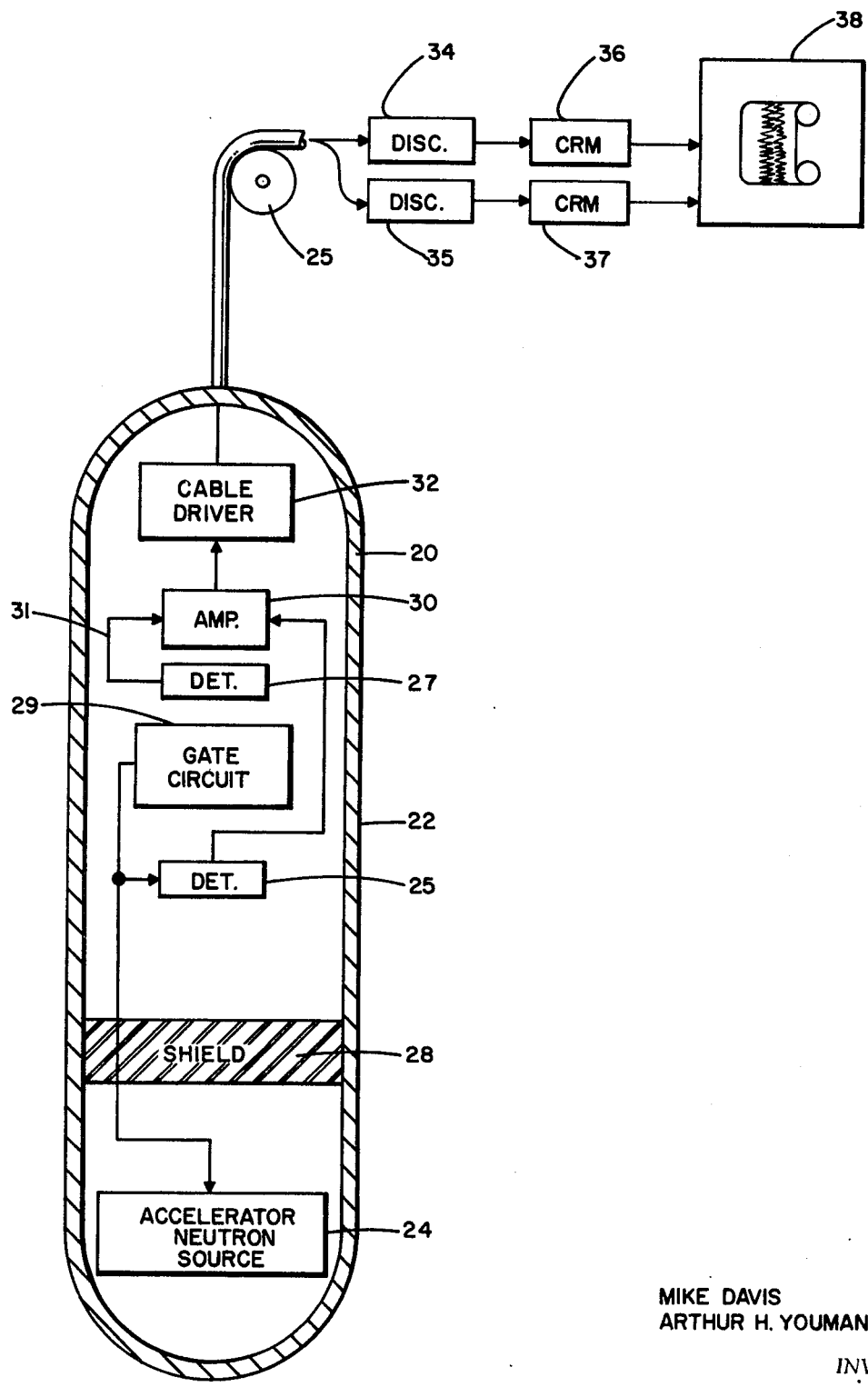

United States Patent

[11] 3,600,582

[72] Inventors Mike Davis;
Arthur H. Youmans, Both of Houston, Tex.
[21] Appl. No. 733,878
[22] Filed June 3, 1968
[45] Patented Aug. 17, 1971
[73] Assignee Dresser Industries, Inc.
Dallas, Tex.

[54] RADIOACTIVE TRACER WELL LOGGING
7 Claims, 3 Drawing Figs.

[52] U.S. Cl. .................................................. 250/83.3,
250/83.6, 250/106
[51] Int. Cl. ........................................................ G01v 5/00
[50] Field of Search ............................................ 250/83.3,
83.6 W, 106 IL, 106 T

[56] References Cited
UNITED STATES PATENTS
2,480,674  8/1949  Russell ......................... 250/106 IL 3,019,341  1/1962  Monaghan ..................... 250/106 T
3,070,696  12/1962  McEwen ....................... 250/106 T
3,102,956  9/1963  Armistead .................... 250/83.6 W
3,379,884  4/1968  Youmans ...................... 250/83.3

*Primary Examiner*—Archie R. Borchelt
*Attorneys*—Robert W. Mayer, Daniel Rubin, Peter J. Murphy, Frank S. Troidl, Roy L. Van Winkle and William E. Johnson, Jr.

ABSTRACT: The thermal neutron capture cross section of the fluid in an earth borehole is altered by the addition of a soluble neutron absorber and a radioactive tracer material, the tracer material serving to facilitate location of the injected fluid by means of a radiation detector and the neutron absorber serving to facilitate measurement of the pore volume occupied by the injected fluid in the formations surrounding the borehole by measurement of the thermal neutron capture cross section of the formation.

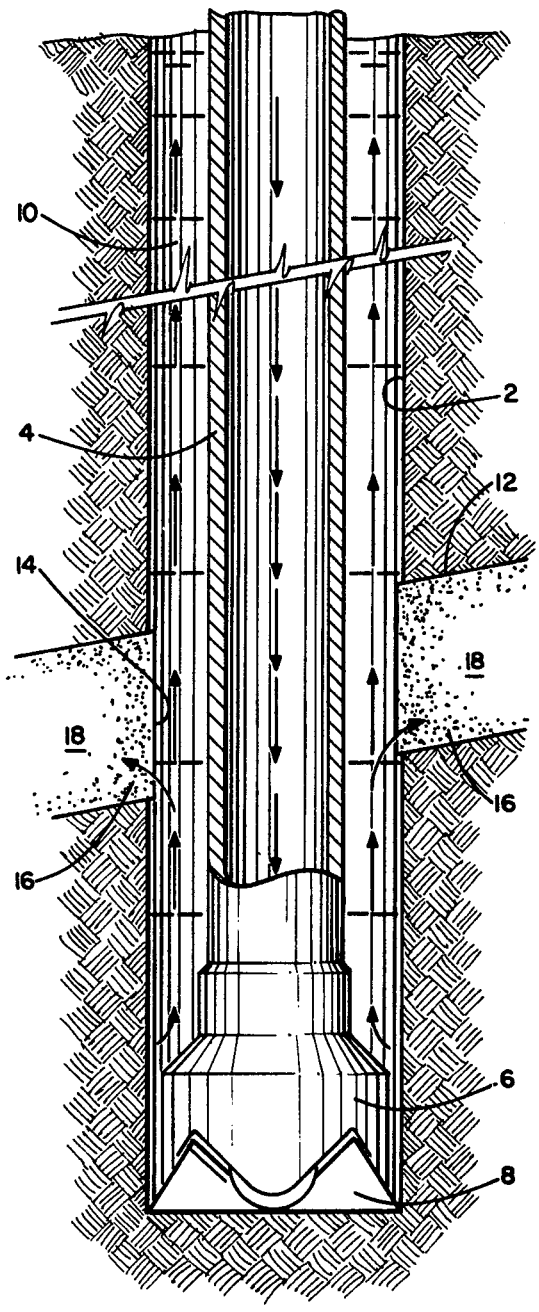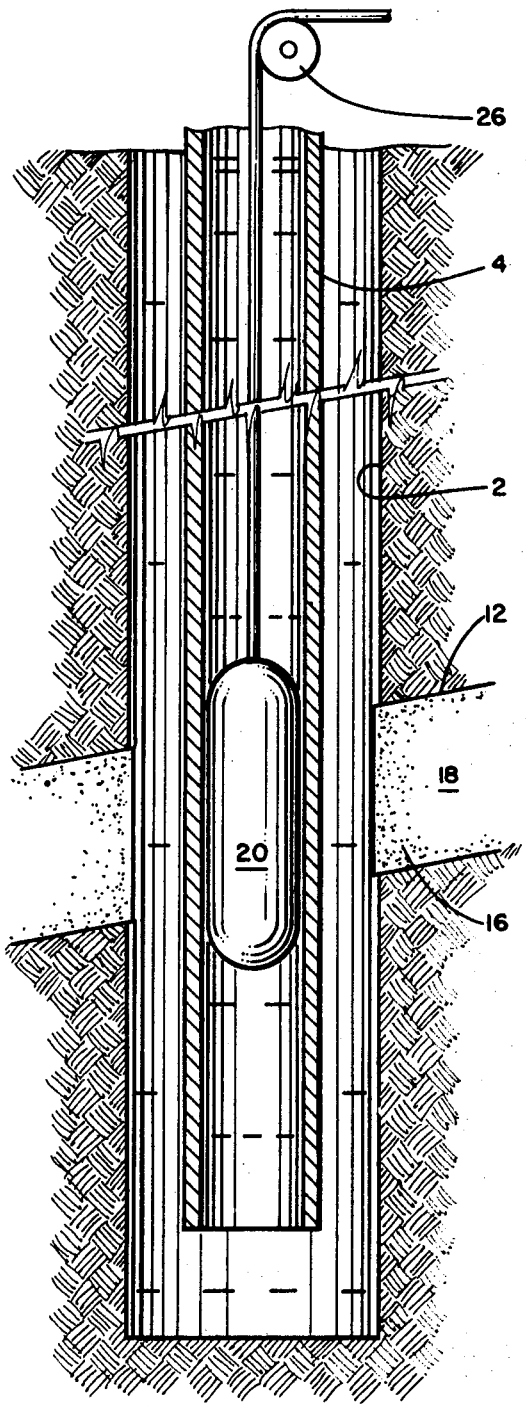
FIGURE 1
FIGURE 2
MIKE DAVIS
ARTHUR H. YOUMANS
INVENTORS
BY William E. Johnson Jr.
ATTORNEY

MIKE DAVIS
ARTHUR H. YOUMANS
INVENTORS

RADIOACTIVE TRACER WELL LOGGING

BACKGROUND OF THE INVENTION

This invention relates generally to method and apparatus for performing radiological surveys of subsurface earth formations traversed by a borehole, and more particularly, relates to improved neutron method and apparatus for investigating fluid movement in the borehole and in the formations surrounding the borehole.

Numerous methods have heretofore been devised for locating porous or permeable formations that have been penetrated by an earth borehole. Among these methods are those which employ a fluid that has been rendered radioactive by the addition thereto of substances such as iodine 131, xenon 133, palladium 109, cerium 144, cerium 141, and osmium 191. After the fluid bearing the tracer material has been injected into the borehole, a radiation detector is used to determine the distribution of the material. For example, the fluid may be pressured into a porous zone while depositing the radioactive tracer material upon the face of the zone. Thus, the detector is able to mark the faces of such porous zones. However, in such an example, where the injected fluid is purposely selected to have characteristics which prevent the tracer material itself from diffusing into the porous zone, the method fails to provide an indication of the extent to which the rest of the fluid is diffused into the formation.

It is therefore the primary object of this invention to provide improved method and apparatus for determining the characteristics of the formation surrounding an earth borehole;

It is a further object of this invention to provide improved method and apparatus for performing radioactive tracer logging of fluid movement in earth boreholes;

It is still another object of this invention to provide improved method and apparatus involving injected fluids used in the logging of earth boreholes which determine both the concentrations of radioactive tracer materials from the fluid and also the pore volume into which the injected fluids occupy in the formations.

The objects of the invention are accomplished, broadly, by method and apparatus which cause a fluid having both a neutron absorber and a radioactive tracer material to be injected into the earth borehole. The neutron absorber causes the neutron capture cross section of the fluid to be increased. For example, a predetermined amount of such material may be added to the borehole fluid such that its capture cross section is large compared to that of the formation fluids occuring at depths of interest. Following the fluid injection, the borehole is traversed with a logging instrument having a pulsed neutron source, as well as one or more radiation detectors, which, in combination, provide an indication of the concentration of the tracer material and also an indication of the extent to which the injected fluid is diffused into the formation, the extent being determined by a measurement of the thermal neutron capture cross section of the formation.

These and other object, features and advantages of the invention will become evident by reference to the following description and drawings in which like numerals indicate like parts and in which:

FIG. 1 is a pictorial representation, partly in cross section, wherein is depicted a typical borehole containing a string of drill pipe with drill bit, and showing the flow of drilling mud in and out of the borehole and into a porous formation traversed by the borehole;

FIG. 2 is a pictorial representation, partly in cross section, of the borehole depicted in FIG. 1 wherein the drill string and bit have been removed, and wherein wire line logging apparatus employing circuitry suitable to the present invention has been run into the borehole for logging the adjacent formations; and FIG. 3 is a schematic and functional representation of the details of apparatus suitable for logging the formation.

Referring now to the drawing in more detail, and specifically to FIG. 1, there is illustrated a pictorial representation of a typical borehole 2 containing a string of conventional drill pipe 4 with a rotary drill bit 6 mounted on the lower end thereof. As is well known in the art, it is common practice during rotary drilling operations to pump a continuous flow of drilling mud down through the drill pipe string 4 to the bottom of the borehole 2. The drilling mud stream, as noted by the arrows, exits from the drill bit 6 through ports therein and flows out over the teeth of the cutting wheels 8 to function as a coolant and lubricant for the drill bit 6. From the bottom of the borehole 2, the drilling mud flows up the borehole 2 through the annulus 10 to the surface to carry the rock chips and other cuttings away from the drill bit 6.

Also illustrated in FIG. 1 is a porous (and thus a potentially fluid-bearing) earth formation 12 which has been traversed by the borehole 2 and drill bit 6, and which may be presumed to contain oil and either fresh or salt water to an unknown extent. Although these formation fluids may be trapped in the formation 12 under a pressure, they do not escape into the borehole as long as the pressure in the borehole is made to exceed the pressure in the formation 12. For reasons to be explained hereinafter, an additional fluid is injected into the borehole along with the drilling mud, the additional fluid having a radioactive tracer material, for example, cadmium 109. A system for adding the additional fluid to the drilling mud is disclosed in U.S. Pat. No. 2,480,674 to W. L. Russell, issued Aug. 30, 1949. The additional fluid also contains a neutron absorber, for example, cadmium. Since cadmium and cadmium 109 are chemically identical, no separation of the two components, i.e., the tracer and the absorber, can occur, due to physical or chemical effects. However, depending upon the effect desired, the tracer and absorber could be injected into the borehole in different chemical forms. For example, the tracer could be in the form of insoluble particles while the neutron absorber is in solution. As another example, the tracer might be soluble in oil whereas the absorber might be soluble in water.

Furthermore, those skilled in the art will recognize that the tracer need not be radioactive when first injected into the borehole, but can be so activated while in the borehole by neutron bombardment, such a process also being disclosed in the Russell patent referred to above.

Those in the art will also recognize that there are also other systems for injecting the tracer material into the borehole, for example, as in U.S. Pat. No. 2,320,643 to J. Neufeld, issued June 1, 1943, wherein the tracer is selectively released from an instrument lowered into the borehole.

As the drilling mud is driven against the face of the porous formation 12 in FIG. 1 which acts as a filter, the solid undissolved particles in the drilling mud will tend to be filtered out to form a mud cake 14 on the face of the formation 12, and hydraulic pressure in the borehole and the whipstocking action of the revolving drill string 4 against the wall of the borehole 2 combine to form this mud cake 14 into an effective seal insofar as the natural fluids in the formation 12 are concerned. However, before a sufficient amount of the solid matter in the drilling mud has filtered out on the face of the formation 12, and before the mud cake 14 has been compressed into seal on the face of the formation, a substantial volume of the liquid portion of the drilling mud will enter the porous zone or formation 12 as a mud filtrate.

As mentioned above, there is also injected into the borehole a neutron absorber which serves to alter the thermal neutron capture cross section of the mud filtrate to correspond to that of the borehole fluid. In this respect, it should be remembered that the ingredients of commercial drilling muds are selected for many specific purposes, not the least of which is that it is particularly desirable that the drilling mud not radically affect the character of the formation insofar as resistivity and induction logging measurements are concerned. Accordingly, if such characteristics are to be considered, such additives should preferably be restricted to soluble compounds of boron, lithium, cadmium, gadolinium, and the like, since these elements have an extremely large thermal neutron capture cross section and since only a relatively minute amount can effect a substantial change in the thermal neutron capture cross section of the mud filtrate.

In one embodiment of the invention it is desirable that the amount of neutron absorber added to the mud be such that the thermal neutron capture cross section of the mud filtrate thereafter correspond to that of the formation fluid. In this case s sample of the formation fluid must be measured or otherwise analyzed to determine its initial thermal neutron capture cross section. Then an amount of absorber material is added such that the resultant mud filtrate fluid has a macroscopic capture cross section per cubic centimeter just equal to that of the formation fluids expected to be encountered. This mixture is then injected into the borehole along with the radioactive tracer material, all as set forth in various embodiments herein described.

In the case of the application of the present invention to mud filled well bore, the mud filtrate may be treated as above described prior to the drilling of the borehole. In such case, the mud filtrate invades the formation exposed by the drill bit and diffusion of fluid into the rock pores continues until a mud cake forms. The radioactive tracer, if in particulate form, will then be found primarily in the mud cake whereas the neutron absorbing material added to the mud filtrate will be diffused in the pores of the rock adjacent the borehole. In general the total volume of invading filtrate depends upon the sealing qualities of the mud rather than on the porosity of the rock. Therefore, in rocks of low porosity the invasion is deeper than in rocks of high porosity. Measurement of the neutron capture cross section after invasion will provide a measure of the pore volume occupied by drilling mud filtrate in accordance with the following relation:

$$\Sigma_{means} = \Sigma_r(1-\Phi) + \Sigma_{fluid}\Phi_{fluid} + \Sigma_{filtrate}\Phi_{filtrate} \quad (1)$$

where $\Sigma_{meas}$ is the measured thermal neutron capture cross section; $\Sigma_r$, $\Sigma_{fluid}$, and $\Sigma_{filtrate}$ are the respective capture cross section values of rock, native fluid and mud filtrate; and $\Phi$, $\Phi_{fluid}$ and $\Phi_{filtrate}$ are respectively the porosity, the porosity occupied by native fluid and that occupied by mud filtrate. Of course $\Phi_{fluid} + \Phi_{filtrate} = \Phi(2)$. The porosity $\Phi$ may be determined from well-known logging techniques or from core data. $\Sigma_r$ may be determined by chemical analysis of rock samples or by empirical measurements in zones having known fluid content. In practicing the invention, $\Sigma_{meas}$ is measured by logging; $\Sigma_{fluid}$ is known from chemical analysis of fluid samples, and $\Sigma_{filtrate}$ is preselected by adding a known proportion of neutron absorbing material to the mud. Thus $\Phi_{filtrate}$ is the only unknown remaining in equation (1), making it possible to determine the pore volume into which the mud filtrate has diffused.

The function of the radio tracer is to permit location of the zones where fluid has entered the formation and thereby facilitate the measurement.

In addition, the presence of the radio tracer provides valuable supplementary information. For example, if the fluid enters the formation through fractures or channels it may not diffuse into the rock pore space so as to produce an effect on the measured neutron capture cross section. It will, in general, be nonetheless detectable due to the presence of the radio tracer. Thus, zones taking fluid without sweeping an appreciable proportion of the native fluid from the pore space will be detected by the presence of the radio tracer whereas the neutron capture cross section is substantially unaffected.

It will be seen that the radio tracer and the neutron absorber cooperate in a unique way: the radio tracer, when in insoluble form, indicates the total amount of tracer-bearing fluid which has entered the formation at a particular depth; the neutron absorber indicates the volumetric proportion of the pore space occupied by the invading fluid. Thus, the radio tracer indicates the total volume of invading fluid; the neutron absorber indicates the sweep efficiency of the invasion.

A special adaptation of the above method is of extraordinary interest. In this adaptation the capture cross section of the mud filtrate is altered by addition of a neutron absorber, for example, borax, so as to have the same value as that of the native formation water. It will be seen that in this case, invasion of mud filtrate into a water bearing formation will not produce any change in the measured thermal neutron capture cross section; yet a radio tracer deposit will be deposited on the borehole face, indicating that fluid has entered the formation. Thus the radio tracer will reveal that the formation is permeable; and the fact that no change occurs in capture cross section reveals that the formation contains only water. If, on the other hand, the formation is partially saturated with oil, the invading filtrate will flush away part but not all of the oil. In such a case, the radio tracer will reveal that the formation is permeable; and the capture cross section will reveal that it is not wholly saturated with water. Accordingly, the conclusion may be drawn that the zone in question is a permeable oil bearing formation. It is apparent that without the radio tracer it would not be possible to judge whether the zone was permeable from the capture cross section measurement alone.

The above discussion has, by way of example, disclosed the embodiment wherein the radio tracer and neutron capturing materials are placed in the drilling mud prior to drilling at least part of the well. A further embodiment relates to the instance where the well is already drilled and it is desired to measure certain of the drilled formations. In such an instance, a mud cake will have formed on the face of permeable formations such that further fluid entry does not readily occur. In such case, the mud is circulated to fill the hole in the vicinity of the zones to be measured with uniformly mixed fluid having radio tracer and neutron absorber added as previously disclosed. Inside the drill pipe (or other tubing) the logging instrument is positioned. A scraper or scratcher on the outside of the pipe is adapted for removing mud cake from the rock face when the pipe is rotated or reciprocated. Such a scraper or scratcher is disclosed in copending U.S. application Ser. No. 698,530 of Arthur H. Youmans, filed Jan. 17, 1968 and assigned to the assignee of the present invention. In this way, mud cake can be removed to permit fluid invasion of the formation. After the zones of interest have been thus cleaned to permit invasion of fluid, the tagged mud is removed from the vicinity by circulating it out of the well. Then the logging instrument traverses the zones of interest, making a log of radioactivity and of neutron capture cross section. Wherever radio tracer is detected, it may be concluded that invasion occurred. An wherever changes in capture cross section occur a measure of the pore saturation of filtrate can be made.

Substantially the same technique can be used in water injection wells. In this case, no mud cake may be present. The radio tracer serves to provide a means for assuring that tagged fluid is opposite the zones of interest. With the instrument inside the tubing, a measurement of capture cross section may be made as invasion takes place, thereby making it possible to observe the rate at which equilibrium saturation of the invading filtrate is obtained.

Referring now to FIG. 3, there is illustrated a detailed representation of the logging instrument 20, depicted generally in FIG, 2, and which is suitable for purposes of the present invention. An elongated housing 22 suspended from one end of a conventional logging cable 25 is adapted to traverse the borehole 2 to progressively survey the adjacent earth formations. The cable 25 may be supported in any convenient manner such as by a sheave wheel 26 which rotates to provide an indication of depth in the borehole as the cable 25 is either caused to move into or be drawn out of the borehole 2. The sheave wheel 26 may be supported in any convenient manner, for example, by a conventional derrick (not illustrated) erected over the mouth of the borehole.

In the housing 22 there may be disposed a source 24 of high energy neutrons and a suitable radiation detector 26. A radiation shield 28 is preferably interposed between the source 24 and the detector 26 to prevent direct irradiation of the detector.

The neutron source 24, for example, the static atmosphere particle accelerator employing the D-T reaction, and which is disclosed in U.S. Pat. No. 2,689,918 to Arthur H. Youmans, issued on Sept. 21, 1954, may be any apparatus suitable for producing discrete pulses or bursts of fast neutrons at a preselected rate. The radiation detector 26 may be responsive to wither thermal neutrons or gamma rays, and could be, for example, either a scintillation counter, a boron trifluoride counter, or any other suitable detection apparatus. Since it is desirable to synchronize the gating of the detector 26 with the pulsation of the source 24, gating circuitry 29 such as that depicted in U.S. Pat. No. 3,358,142 to Eric C. Hopkinson et al., issued Dec. 12, 1967, is provided to pulse the neutron source 24 at a preselected frequency and to synchronously actuate the detector 26 for at least two time intervals between the pulses of fast neutrons from the source 24. For example, a representative gating sequence may provide for 1000 fast neutron pulses per second with each pulse being about 10 microseconds in duration, and for two detection intervals of 200 microseconds each, with the first detection interval commencing 400 microseconds after each actuation of the source, and with the second detection interval commencing 700 seconds after such actuation.

As further illustrated in FIG. 3, other conventional circuitry may be provided in the instrument housing 22. For example, the output of the detector 26 may be connected to a suitable amplifier and discriminator 30 having its output signal connected to a pulse shaper and cable driver circuit 32 of conventional design. The output signal from the cable driver circuit is preferably connected to one or more conductors in the logging cable 25 for transmission to the earth's surface. At the surface, the logging signals may be connected to conventional pulse discrimination circuitry 34 and to one or more count rate meters 36, the outputs of which may be applied to a conventional recorder 38 of any suitable design.

There is also illustrated in FIG. 3 a second radiation detector 27, for example, a Geiger-Muller counter, an ionization chamber, or a scintillation crystal used in conjunction with a photomultiplier, the detector 27 serving to detect the gamma radiation from the radioactive tracer material injected into the borehole. Since the detector 27 is not dependent upon the radiation from the neutron source, but rather from the radioactive tracer material, the actuation of the detector 27 is independent of the gating circuitry 29. However, those skilled in the art will recognize that the actuation of detector 27 could be so synchronized with the gating circuitry if desired. The output from detector 27 is coupled through the conductor 31 into the amplifier and discriminator section 30, the output of which is coupled through the cable driver section 32 to one or more of the conductors in the logging cable 25 for transmission to the earth's surface. At the earth's surface, the signals representative of the radiation detected by the detector 27 are coupled through one or more discriminators 35, and one or more count rate meters 37 into the recorder 38.

As stated above, the detectors 26 and 27 can both be selected to be responsive to gamma rays while detector 26 can be selected, alternatively, to be responsive to thermal neutrons. In one embodiment according to this invention, detector 26 is made responsive to thermal neutrons, thus alleviating the problems relating interplay between the two detectors 26 and 27. In the alternative embodiment, detector 26 is made responsive to gamma rays, as is the detector 27. In order to avoid detector 27 being responsive to gamma rays resulting from neutron capture, as well as to the gamma rays form the radioactive tracer material, detector 27 is placed at least 5 feet away from neutron source 24.

The gamma rays desired to be recorded by detector 26 resulting from neutron capture are those having energies in excess of the energies of available radio tracer materials. Therefore the discriminator of detector 26 is set to exclude all pulses indicative of gamma ray energies below about 2 to 2.5 mev.

If desired to position the detector 27 closer than about 5 feet from the neutron source 24, then detector 27 can only be used to detect radio tracer materials and other low energy gamma rays when the neutron source is turned off.

In the operation of the well logging system described herein, after the neutron absorber and tracer materials have been selected and injected into the borehole, the logging instrument 20 is caused to traverse the borehole 2, During the traversal, the source 24 and detector 26 are gated by the circuitry 29 to measure the decline of the thermal neutron population in the formation surrounding the borehole, for example, the porous formation 12.

As set forth in the U.S. Pat. No. 3,379,884 to Arthur H. Youmans, issued Apr. 23, 1968, the thermal neutron capture cross section is determined as a function of the decline of the thermal neutron population. As illustrated in FIG. 1, the porous zone 12 has an "invaded" zone 16 and an "uninvaded" zone 18, the invasion being that of the mud filtrate into the porous zone 12. Since the thermal neutron capture cross section of the mud filtrate has been increased by the addition of thermal neutron capturing materials the thermal neutron capture cross section of the formations will be increased in proportion to the pore volume occupied by the invading filtrate.

While the instrument provides an indication of the volumetric extent of diffusion of the neutron absorber into the porous zone 12, the detector 27 also provides a means for locating and identifying the porous zone 12, the face of the permeable zone being marked due to the fluid being forced into the porous zone while the radioactivity from the fluid precipitates onto the face. Hence, the precipitation causes a concentration of radiation to occur at the face of the zone.

Thus, it should be appreciated that there has been described and illustrated herein a system wherein fluid having a radioactive tracer material and a neutron absorber is injected into a borehole, and that the logging instrument adapted for use with such a system has means for detecting the porous zones invaded by the fluid, as well as means for determining the volumetric extent of diffusion of the fluid into the porous zone or formation surrounding the borehole.

While the preferred embodiments of the invention have been illustrated and described herein, variations and modifications may be made to such embodiments without departing from the scope of the invention. For example, the radio tracer added to the fluid may be selected to be very small or even colloidal particles or the particles may be of large size to assure their being deposited on the rock face. Again on occasion it may be desirable that the radio tracer be in a soluble form so as to pass into the rock pores along with the injected fluid. Moreover, the radio tracer may be selected so as to emit only low energy gamma rays, thereby permitting the use of detector 27 with two channels of information, one with a relatively high discriminator setting so as to make a log of natural gamma radiation uneffected by the radio tracer, and the other a low discriminator setting whereby the radio tracer as well as natural gamma radiation are sensitively detected.

In the preferred embodiment, the measurement of the thermal neutron capture cross section is accomplished simultaneously with the measurement of the tracer activity. However, those skilled in the art will recognize that the two measurements could be accomplished at separate times. Accordingly, such modifications and variations of the preferred embodiments as fall withing the scope of the invention are intended to be covered by the appended claims.

The embodiments of the invention in which an exclusive property or privilege is claimed are defined as follows:

1. A method of investigating the character of a subsurface earth formation traversed by a borehole, comprising:
   injecting into said borehole a radioactive fluid having a preselected thermal neutron capture cross section;
   thereafter irradiating said fluid and said formation with at least one discrete burst of fast neutrons;
   detecting during at least two discrete time intervals radiations occasioned in said formation by said fast neutrons, whereby the decline of the thermal neutron population is said formation can be determined; and detecting the concentration of radioactivity in said formation occasioned by the injection of said radioactive fluid.

2. A method of investigating the character of a subsurface earth formation traversed by a borehole, comprising:

injecting into said borehole a fluid having a preselected thermal neutron capture cross section;

injecting into said borehole a radioactive tracer material;

thereafter irradiating said fluid and said formation with at least one discrete burst of fast neutrons;

detecting during at least two discrete time intervals radiations occasioned in said formation by said fast neutrons, whereby the decline of the thermal neutron population in said formation can be determined; and detecting the concentration of radioactivity in said formation occasioned by the injection of said radioactive fluid.

3. A method of investigating the character of a subsurface earth formation traversed by a borehole, comprising:

injecting a fluid into said borehole having a preselected thermal neutron capture cross section;

injecting into said borehole a fluid being capable of radioactivity when bombarded by neutrons;

thereafter irradiating said fluid and said formation with at least one burst of fast neutrons;

detecting during at least two discrete time intervals radiations occasioned in said formations by said fast neutrons, whereby the decline of the thermal neutron population in said formation can be determined; and detecting the concentration of radioactivity in said borehole occasioned by the bombardment of said fluid by said neutrons.

4. The method according to claim 1 wherein said injected fluid has a thermal neutron capture cross section substantially equal to the thermal neutron capture cross section of the fluid in said borehole prior to said injection.

5. The method according to claim 2 wherein said fluid having a preselected thermal neutron capture cross section and said tracer material are substantially chemically equivalent.

6. The method according to claim 5 wherein said fluid comprises cadmium and said tracer material comprises cadmium 109.

7. The method according to claim 1 wherein said radioactive fluid contains insoluble radioactive particles.